United States Patent
James et al.

(10) Patent No.: US 11,922,945 B2
(45) Date of Patent: *Mar. 5, 2024

(54) VOICE TO TEXT CONVERSION BASED ON THIRD-PARTY AGENT CONTENT

(71) Applicant: GOOGLE LLC, Mountain View, CA (US)

(72) Inventors: Barnaby James, Los Gatos, CA (US); Bo Wang, San Jose, CA (US); Sunil Vemuri, Pleasanton, CA (US); David Schairer, San Jose, CA (US); Ulas Kirazci, Mountain View, CA (US); Ertan Dogrultan, Belmont, CA (US); Petar Aleksic, Jersey City, NJ (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,606

(22) Filed: Mar. 23, 2023

(65) Prior Publication Data

US 2023/0260517 A1 Aug. 17, 2023

Related U.S. Application Data

(63) Continuation of application No. 17/582,926, filed on Jan. 24, 2022, now Pat. No. 11,626,115, which is a (Continued)

(51) Int. Cl.
*G10L 15/26* (2006.01)
*G06F 40/205* (2020.01)
(Continued)

(52) U.S. Cl.
CPC .......... *G10L 15/26* (2013.01); *G06F 40/205* (2020.01); *G06F 40/284* (2020.01); *G06F 40/30* (2020.01);
(Continued)

(58) Field of Classification Search
None
See application file for complete search history.

(56) References Cited

U.S. PATENT DOCUMENTS

| 7,761,499 B2 | 7/2010 | Hodjat et al. |
| 8,204,738 B2 | 6/2012 | Skuratovsky |
| (Continued) | | |

FOREIGN PATENT DOCUMENTS

| CN | 101297355 | 10/2008 |
| CN | 104509080 | 4/2015 |
| (Continued) | | |

OTHER PUBLICATIONS

China National Intellectual Property Administration; Notification of First Office Action issued in Application No. 201780076180.3; 21 pages; dated Nov. 28, 2022.

(Continued)

*Primary Examiner* — Shaun Roberts
(74) *Attorney, Agent, or Firm* — Gray Ice Higdon

(57) ABSTRACT

Implementations relate to dynamically, and in a context-sensitive manner, biasing voice to text conversion. In some implementations, the biasing of voice to text conversions is performed by a voice to text engine of a local agent, and the biasing is based at least in part on content provided to the local agent by a third-party (3P) agent that is in network communication with the local agent. In some of those implementations, the content includes contextual parameters that are provided by the 3P agent in combination with responsive content generated by the 3P agent during a dialog that: is between the 3P agent and a user of a voice-enabled electronic device; and is facilitated by the local agent. The contextual parameters indicate potential feature(s) of further voice input that is to be provided in response to the responsive content generated by the 3P agent.

17 Claims, 7 Drawing Sheets

Related U.S. Application Data continuation of application No. 16/791,334, filed on Feb. 14, 2020, now Pat. No. 11,232,797, which is a continuation of application No. 15/372,188, filed on Dec. 7, 2016, now Pat. No. 10,600,418.

(51) Int. Cl.

| | | |
|---|---|---|
| *G06F 40/284* | (2020.01) | |
| *G06F 40/30* | (2020.01) | |
| *G10L 15/18* | (2013.01) | |
| *G10L 15/183* | (2013.01) | |
| *G10L 15/22* | (2006.01) | |
| *G10L 15/30* | (2013.01) | |

(52) U.S. Cl.
CPC ........ *G10L 15/1815* (2013.01); *G10L 15/183* (2013.01); *G10L 15/22* (2013.01); *G10L 15/30* (2013.01); *G10L 2015/223* (2013.01); *G10L 2015/228* (2013.01)

(56) References Cited

U.S. PATENT DOCUMENTS

| | | | |
|---|---|---|---|
| 8,862,467 | B1 | 10/2014 | Casado et al. |
| 10,600,418 | B2 | 3/2020 | James et al. |
| 11,232,797 | B2 | 1/2022 | James et al. |
| 2005/0137868 | A1 | 6/2005 | Epstein et al. |
| 2007/0016401 | A1 | 1/2007 | Ehsani et al. |
| 2007/0150278 | A1 | 6/2007 | Bates et al. |
| 2007/0150286 | A1 | 6/2007 | Miller |
| 2009/0052636 | A1 | 2/2009 | Webb et al. |
| 2009/0299745 | A1 | 12/2009 | Kennewick et al. |
| 2010/0076843 | A1 | 3/2010 | Ashton |
| 2012/0265528 | A1 | 10/2012 | Gruber et al. |
| 2013/0197907 | A1 | 8/2013 | Burke et al. |
| 2014/0040748 | A1 | 2/2014 | Lemay et al. |
| 2014/0052445 | A1 | 2/2014 | Beckford et al. |
| 2014/0278379 | A1 | 9/2014 | Coccaro et al. |
| 2015/0066479 | A1 | 3/2015 | Pasupalak et al. |
| 2015/0073790 | A1 | 3/2015 | Steuble et al. |
| 2015/0302002 | A1 | 10/2015 | Mathias et al. |
| 2015/0370787 | A1 | 12/2015 | Akbacak et al. |
| 2016/0104482 | A1 | 4/2016 | Aleksic et al. |
| 2016/0260433 | A1 | 9/2016 | Sumner et al. |
| 2016/0351194 | A1 | 12/2016 | Gao et al. |
| 2022/0148596 | A1 | 5/2022 | James et al. |

FOREIGN PATENT DOCUMENTS

| | | |
|---|---|---|
| CN | 105027194 | 11/2015 |
| WO | 2015179510 | 11/2015 |

OTHER PUBLICATIONS

European Patent Office; Communication issued in Application No. 21190701.9; 7 pages; dated Nov. 18, 2021.

European Patent Office; Intention to Grant issued in Application No. 17778419.6; 45 pages; dated Feb. 11, 2021.

International Search Report and Written Opinion of PCT Ser. No. PCT/US2017/052730; 12 pages dated Dec. 14, 2017.

United Kingdom Intellectual Property Office; Examination Report issued in Application No. 1715619.1 dated Mar. 19, 2018.

European Patent Office; Written Opinion of the International Preliminary Examining Authority; 6 pages; dated Oct. 22, 2018.

European Patent Office; International Preliminary Report on Patentability of PCT/US2017/052730; 18 pages; dated Feb. 25, 2019.

United Kingdom Intellectual Property Office; Examination Report issued in Application No. GB1715619.1 dated Aug. 27, 2019.

European Patent Office; Examnation Report issued in Application No. 17778419.6 dated Oct. 10, 2019.

China National Intellectual Property Administration; Grant Notice issued in Application No. 201780076180.3; 4 pages; dated May 31, 2023.

European Patent Office; Intention to Grant issued in Application No. 21190701.9; 50 pages; dated Jul. 7, 2023.

VOICE TO TEXT CONVERSION BASED ON THIRD-PARTY AGENT CONTENT

BACKGROUND

Voice-enabled electronic devices such as smart phones, vehicle computing systems, wearable devices, tablet computers, and standalone voice-activated speakers are becoming more ubiquitous. A voice-enabled electronic device often includes, and/or is in network communication with, a "local" agent that facilitates various aspects of a user's voice-based interactions with the device. The local agent may be implemented via the voice-enabled electronic device itself and/or via one or more remote computing devices that are in network communication with the voice-enabled electronic device (e.g., computing device(s) in "the cloud").

The local agent is "local" in the sense that it directly receives voice input (e.g., a streaming audio recording of a human's voice) provided via the voice-enabled electronic device, at least initially process the received voice input, and provides, for presentation (e.g., audible and/or graphical) via the electronic device, output that is responsive to the received voice input. For example, the local agent may initially process received voice input by performing at least voice to text (also known as speech to text) conversion that converts that voice input to text. Also, for example, the local agent may further provide output that is responsive to that voice input. For instance, the local agent itself may generate responsive content, and generate output that is based on the responsive content.

SUMMARY

This specification is directed generally to various implementations that dynamically, and in a context-sensitive manner, bias voice to text conversions. The voice to text conversions are each of corresponding voice input that is based on spoken input of a corresponding user and that is captured by microphone(s) and/or other transducer(s) of a voice-enabled electronic device (also referred to herein as "electronic device").

In various implementations, the biasing of voice to text conversions is performed by a voice to text engine of a local agent, and the biasing is based at least in part on content provided to the local agent by a third-party (3P) agent that is in network communication with the local agent. In some of those implementations, the content includes contextual parameters that are provided by the 3P agent in combination with responsive content generated by the 3P agent during a dialog that: is between the 3P agent and a user of a voice-enabled electronic device; and is facilitated by the local agent. The contextual parameters indicate potential feature(s) of further voice input that is to be provided in response to the responsive content generated by the 3P agent.

As one example, the local agent may be in network communication with both the electronic device and the 3P agent. In facilitating a dialog between the 3P agent and the user of the electronic device, the local agent may perform one or more iterations of: receiving voice input from the electronic device; converting the voice input to text (optionally based on a most recent iteration of 3P agent provided contextual parameters); transmitting at least part of the converted text (and optionally additional content) to the 3P agent; receiving responsive content (and optionally dynamically updated contextual parameters) from the 3P agent in response to the transmitting; and providing output that is based on the responsive content (e.g., performing a text to voice conversion when the responsive content is in a textual format, and providing the converted voice output to the electronic device for audible presentation).

Accordingly, for received voice input that is intended for transmission to a 3P agent, a voice to text engine of a local agent may convert that voice input into text while taking into account contextual parameters of the 3P agent that are relevant to that voice input. This may increase the accuracy and/or robustness of the voice to text conversion performed by the voice to text engine. For example, the voice to text engine may modify one or more values of, and/or generated by, a voice to text model used in voice to text conversion—and may modify those values to increase the likelihood that text that conforms to the contextual parameters of the 3P agent is selected as the text that conforms to the received voice input. Moreover, in various implementations the contextual parameters may be dynamically updated by the 3P agent (and provided to the local agent) at each "turn" of a dialog, thereby enabling the local agent to adapt the voice to text conversion at each turn to be more tailored to likely voice input to be received at that turn. As described in more detail herein, contextually converted text may be transmitted by the local agent to the 3P agent, and the 3P agent may generate further responsive content that is based on that contextually converted text. Implementations described herein increase the likelihood that the contextually converted text provided to the 3P agent is an accurate representation of the corresponding voice input and, as a result, an accurate representation of the spoken input on which that corresponding voice input is based. This may improve performance of the 3P agent and/or reduce the use of various computational resources that may otherwise be consumed by inaccurate representations of voice inputs (e.g., network traffic consumed by additional "turns" that may be necessary to correct inaccurate representations of voice input).

As used herein, a 3P agent references one or more computing devices and/or associated software managed by a party that is separate from a party that manages a local agent. The 3P agent is configured to receive converted text and/or other content from the local agent. In response to receiving the converted text and/or other content, the 3P agent generates content based on the received converted text and/or other content, and transmits the generated content to the local agent for provision of output, by the local agent, that is based on the 3P agent transmitted content. A 3P agent and a local agent may be in selective network communication with one another. In some implementations, a local agent and a 3P agent may exchange data via one or more application programming interfaces (APIs).

A 3P agent may often be configured to perform one or more particularized functions such as, for example: booking a restaurant reservation; ordering food; purchasing movie tickets; purchasing services; requesting services (e.g., transportation); managing text, email, or other electronic communications of a user; providing guidance for a task of a user (e.g., mixing a drink, fixing a leaky faucet); etc. As described herein, in some implementations a local agent may initiate and facilitate a dialog between a user (via an electronic device) and a 3P agent in response to invocation of the 3P agent by the user (e.g., via voice input provided by the user via the electronic device). In some of those implementations, the invocation may be the occurrence of "key word(s)" for the 3P agent in voice input and/or reference to an action and/or item managed by the 3P agent. For example, a movie ticket purchase agent may be invoked by voice input of "talk to movie ticket agent" (where "movie ticket agent" is a keyword for the 3P agent), "buy some movie tickets" (where "movie tickets" are an item managed by the 3P agent), "use movie ticket agent to buy tickets", etc.

In some implementations, a method performed by one or more processors is provided and includes: receiving a voice input provided by a user via a voice-enabled electronic device; performing a voice to text conversion to convert the voice input to text; transmitting the text to a third-party agent via one or more network interfaces; and receiving content from the third-party agent in response to transmitting the text. The receiving is via one or more of the network interfaces and the content includes responsive content that is responsive to the text. The method further includes providing output that is based on the responsive content for presentation to the user via the voice-enabled electronic device; receiving an additional voice input provided by the user via the voice-enabled electronic device and provided by the user in response to the output; and using the content received from the third-party agent to perform an additional voice to text conversion to convert the additional voice input to additional text.

These and other implementations of technology disclosed herein may optionally include one or more of the following features.

In some implementations, the content received from the third-party agent further includes contextual parameters that are in addition to the responsive content and that indicate one or more potential features of further voice input to be provided in response to the responsive content. In some of the contextual parameters implementations, using the content to perform the additional voice to text conversion comprises using the contextual parameters to perform the additional voice to text conversion.

In some of the contextual parameters implementations, a voice to text model is used in performing the additional voice to text conversion and using the contextual parameters to perform the additional voice to text conversion includes: biasing, based on the contextual parameters, values that are generated over the voice to text model. In some versions of those implementations, the one or more potential features indicated by the contextual parameters include particular tokens and biasing the values that are generated over the voice to text model based on the contextual parameters includes: modifying scores generated for the particular tokens over the voice to text model. The contextual parameters received from the third-party agent may include the particular tokens and/or a semantic type of tokens. When the contextual parameters include the semantic type of tokens, the method may further include determining the particular tokens based on the particular tokens being stored in association with the semantic type. For example, the particular tokens may be determined based on the particular tokens being stored in association with both the user and the semantic type and/or based on the particular tokens being previously provided by the third-party agent in association with the semantic type.

In some of the contextual parameters implementations, the one or more potential features indicated by the contextual parameters include state path indications that indicate potential paths of the further voice input in a voice to text model.

In some of the contextual parameters implementations, using the contextual parameters to perform the additional voice to text conversion includes converting the additional voice input to the additional text using both the contextual parameters and additional user parameters that are assigned to the user or the device, and were assigned independent of the content received from the third party agent. In some of those implementations, the additional user parameters are based on at least one of: a location associated with the user and additional electronic devices associated with the user.

In some of the contextual parameters implementations, the responsive content and the contextual parameters are received as part of single transmission received from the third-party agent.

In some implementations, a voice to text model is used in performing the additional voice to text conversion and using the content to perform the additional voice to text conversion includes: generating a contextual voice to text model based on the content; and selecting the additional text based on both the voice to text model and the contextual voice to text model.

In some implementations, using the content to perform the additional voice to text conversion includes: converting a first segment of the voice input to a first textual segment of the additional text with biasing based on the content; and converting a second segment of the voice input to a second segment of the additional text without biasing based on the content. The second segment of the voice input may be subsequent to the first segment. In some of those implementations, the method further includes determining to not bias the second segment of the voice input based on contextual parameters included in the content. Determining to not bias the second segment may be based on the contextual parameters indicating that contextual biasing should not occur following a voice input segment that conforms to the first textual segment.

In some implementations, a method performed by one or more processors is provided and includes: storing an association of contextual parameters to an invocation of a third-party agent; receiving a voice input provided by a user via a voice-enabled electronic device; converting a first segment of the voice input to text using a voice to text model and without biasing of the voice to text model based on the contextual parameters; and determining that the text conforms to the invocation. The method further includes, in response to determining that the text conforms to the invocation of the third party agent and in response to the contextual parameters being stored in association with the invocation: converting a second segment of the voice input to additional text using the voice to text model and using the contextual parameters to bias the voice to text model. The second segment of the voice input is subsequent to the first segment, and the method further includes transmitting at least a portion of the additional text to the third-party agent.

In some implementations, the invocation is a reference to an action and/or item managed by the third-party agent In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
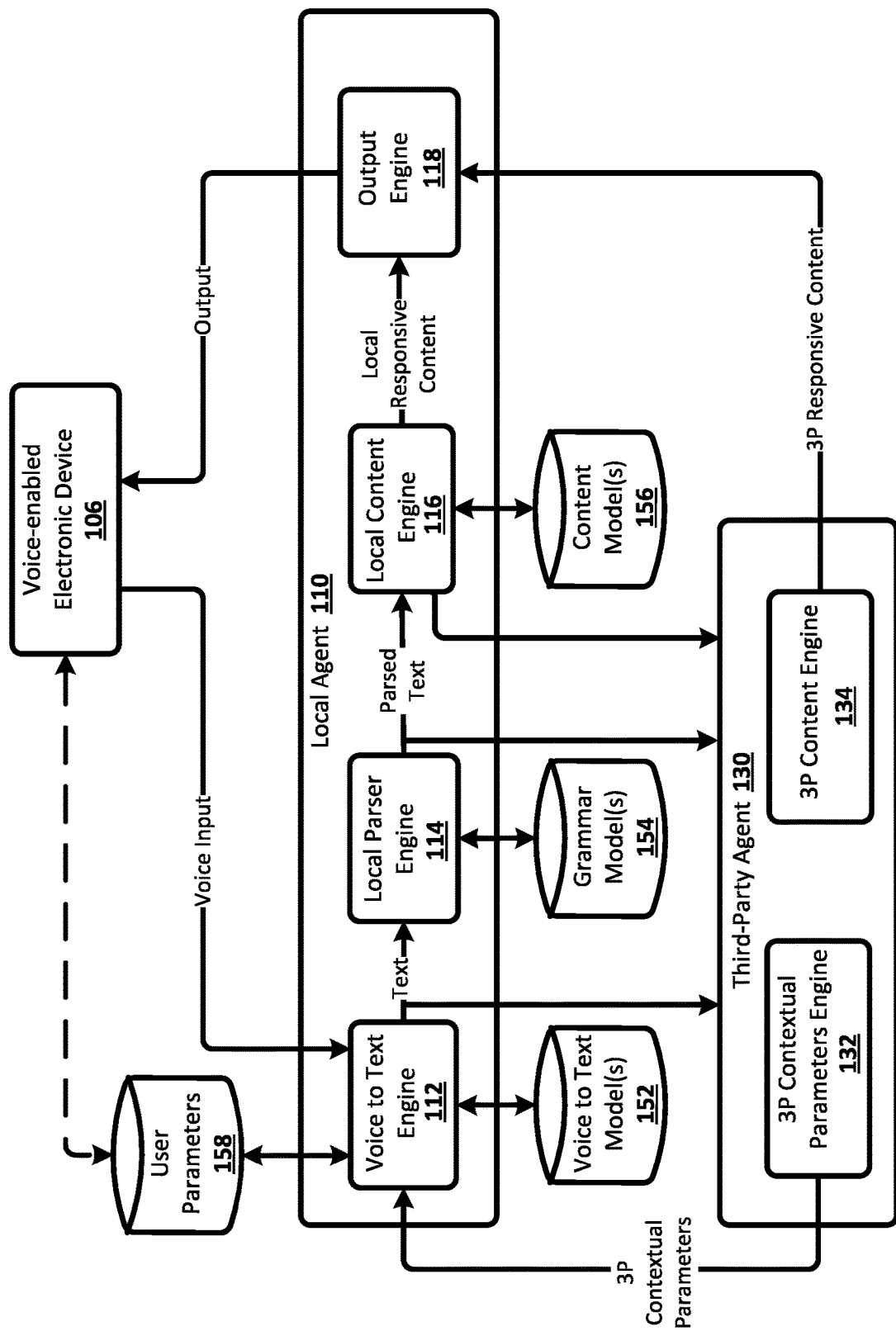
FIG. 1 is a block diagram of an example environment in which implementations disclosed herein may be implemented.

As described above, a voice-enabled electronic device often includes, and/or is in network communication with, one or more local agents that facilitate various aspects of a user's voice-based interactions with the electronic devices. A local agent may be implemented via the electronic device itself and/or via one or more remote computing devices that are in network communication with the electronic device. A local agent is "local" in the sense that it directly receives voice input provided via an electronic device, at least initially process the received voice input, and provides, for presentation, output that is responsive to the received voice input. For example, the local agent may initially process a received voice input by at least performing voice to text conversion of that voice input to text. The local agent may further provide output that is based on responsive content that is responsive to that voice input.

In some situations the local agent may generate responsive content without engaging a 3P agent. For example, the local agent may itself generate responsive content in response to received voice input. For instance, the local agent may contain one or more engines that receive the text conversion of the received voice input (and optionally annotations of the text), and generate local responsive content based on the text and/or other factors (e.g., earlier dialog, user preference(s), etc.). As one example, the local agent may generate responsive content in an attempt to enable appropriate selection of a 3P agent. For instance, assume voice input of "tickets to Chicago". The local agent may generate local responsive content such as "do you want plane, train, or theatre tickets" in response to such voice input to enable the local agent to "disambiguate" multiple available 3P "ticket" agents. The local agent may then utilize responsive voice input to select an appropriate 3P agent (e.g., select an "airline agent" in response to responsive voice input of "plane").

However, in some situations the local agent may instead engage a 3P agent for generating responsive content in response to received voice input. For example, if received voice input includes a 3P agent invocation (e.g., a "keyword" for the 3P agent or reference to an action and/or item managed by the 3P agent), the local agent may transmit at least a portion of the text conversion of the voice input (and optionally annotations of the text and/or other parameters) to the 3P agent. That 3P agent may then utilize the provided text and its own semantic engine(s) to generate 3P responsive content, and transmit that 3P responsive content to the local agent. The local agent may then provide output that is based on the 3P responsive content. If the output is a prompt that solicits additional 3P related voice input from the user, that additional voice input may again be converted into text by the local agent and provided to the 3P agent. This general process may continue until, for example, the 3P agent provides responsive content that terminates the 3P agent session (e.g., an answer or resolution instead of a prompt), additional voice input of the user terminates the 3P agent session (e.g., instead invokes a response from the local agent or another 3P agent), etc.

As one example, assume initial voice input of "book a table at eight", which invokes a 3P "restaurant reservation" agent. The local agent may provide at least some of the text conversion of that voice input to the 3P agent. The 3P agent may generate responsive content and provide the responsive content to the local agent. For example, the 3P agent may provide the text "any cuisine preference?". The local agent may then provide output based on that responsive content, such as a voice conversion of the text "any cuisine preference?". Additional voice input corresponding to "Laotian cuisine" may be provided in response to the output of "any cuisine preference", that additional voice input converted to additional text by the local agent, and at least some of the additional text provided to the 3P agent for generating yet additional responsive content.

Accordingly, in various situations the local agent may perform speech to text conversion of received voice input and provide at least some of the converted text to the 3P agent. Implementations disclosed herein recognize that in some situations it may be beneficial to utilize content provided by the 3P agent to increase the accuracy and/or recall of the speech to text conversion performed by the local agent. In some implementations, the content may be in the form of contextual parameters that are provided by the 3P agent. In some of those implementations, the contextual parameters are provided by the 3P agent in combination with responsive content provided by the 3P agent, and the contextual parameters indicate potential features of further voice input to be provided in response to the responsive content. In some implementations, the contextual parameters may additionally or alternatively be gleaned from the 3P agent responsive content itself.

As one example, assume a 3P agent transmits, to a local agent, responsive content of "what cuisine type?". The 3P agent may also transmit (in the same or a separate transmission) contextual parameters that correspond to the responsive content and that indicate potential features of responsive voice input to "what cuisine type?". For example, the contextual parameters may include one or more explicit tokens (e.g., "Italian", "Mexican", "BBQ", "Laotian", "Asian Fusion"), semantic type(s) of tokens (e.g., "cuisine types"), and/or path(s) of a state decoding graph voice to text model (e.g., path(s) corresponding to food and/or cuisine). The local agent may utilize these contextual parameters to bias the voice to text conversion of the responsive voice input that is actually received in response to providing output that corresponds to "what cuisine type?". For example, "cuisine" tokens may be more likely to be chosen over "non-cuisine" tokens in a voice to text conversion. For instance, without biasing based on "cuisines", a voice to text conversion of voice input that is a user's attempt at saying "Laotian" may be the text "vacation". However, with biasing based on "cuisines", the voice to text conversion of that voice input may instead correctly convert the voice input to the text "Laotian". As described herein, the biasing may take various forms, such as modifying a score generated for the text "Laotian" over a voice to text model and/or adding "Laotian" to the voice to text model. For instance, "Laotian" may be added to the voice to text model if it is an "out of vocabulary" token that is not included in the voice to text model. Adding "Laotian" to the voice to text model may include modifying the voice to text model itself or effectively "appending" a separate contextual parameters voice to text model.

In some implementations, provided contextual parameters and "user parameters" may both be utilized to bias the voice to text conversion. For example, assume contextual parameters received from a 3P agent include a semantic type of "restaurants". Further assume the user parameters include tokens that are names of restaurants that are close to a location of the user, such as current location or a "home" location of the user. For instance, names of restaurants close to the user may be pre-stored in association with the user and in association with a semantic type of "restaurants". Based on the contextual parameters including the "restaurants" semantic type, and based on the names of "close" restaurants being indexed or otherwise stored in user parameters, those names of restaurants that are close to the location of the user may be used to bias the voice to text conversion. Additional and/or alternative user parameters may be provided that may be stored in association with corresponding semantic type(s) and/or one or more 3P agents. For example, names of a user's electronic devices that are controllable by a particular 3P agent may be stored in association with semantic type(s) and/or in association with the particular 3P agent. Also, for example, names of contacts of a user may be stored in association with the semantic type of "contact". For instance, assume contextual parameters received from a 3P agent included a semantic type of "contacts", the names of contacts of the user may then be used to bias the voice to text conversion.

In some implementations, provided contextual parameters and previously provided 3P contextual parameters may both be utilized to bias the voice to text conversion. For example, assume contextual parameters received from a 3P agent included a semantic type of "pizza toppings". Further assume the 3P agent previously provided, for use by a local agent, tokens that are names of "pizza toppings" that are offered by the 3P agent. Based on the contextual parameters including the "pizza toppings" semantic type, and based on the names of "pizza toppings" being indexed or otherwise stored in association with that semantic type (and optionally in association with the 3P agent), those names of pizza toppings may be used to bias the voice to text conversion.

In some implementations, a provided contextual parameter may include various combinations of contextual parameter "types". For example, a provided contextual parameter may include both explicit token(s) and semantic token(s). For instance, a provided contextual parameter may be "yes a table at $restaurant", which indicates the explicit sequence of tokens "yes a table at", followed by the semantic type of "restaurant". In such a scenario, voice to text conversion may initially be biased based on "yes a table at", then biased to "restaurant names" (optionally selecting those restaurant names based on user parameters) in response to detection of converted text of "yes a table at". In some implementations, a provided contextual parameter may additional and/or alternatively indicate that biasing should be performed on some portions of voice input, but not on others. For example, a contextual parameter may be of the form "message $contact $some raw text", which indicates voice input may include the token "message", followed by a "contact" token (e.g., a name of a contact of the user stored in user parameters), followed by "open text". In such a scenario, voice to text conversion may initially be biased toward the token "message". In response to detection of the "message" token, the voice to text conversion may then biased toward tokens that are names of contacts of the user. Then, in response to detection of contact token(s), the voice to text conversion may be unbiased (e.g., based on a baseline voice to text model).

Various techniques may be utilized to bias the voice to text conversion using contextual parameters. For example, in some implementations scores may be generated for all or portions of candidate token(s) and/or sequences of token(s) over a "base" voice to text model, and those scores then modified based on the contextual parameters. In some of those implementations, the contextual parameters may be used to generate a contextual parameters language model, and scores generated over the contextual parameters language model utilized to modify the scores generated over the base voice to text model. As another example, in some implementations, one or more tokens indicated by the contextual parameters may be added to the base voice to text model (e.g., added as "out of vocabulary" terms to the model). Additional and/or alternative techniques may be utilized such as modifying values included in a voice to text model based on contextual parameters, modifying values associated with various paths and/or semantic types in a voice to text model, etc.

Now turning to FIG. 1, an example environment in which techniques disclosed herein may be implemented is illustrated. The example environment includes a voice-enabled electronic device 106 (also referred to herein as device 106), a local agent 110, and a third-party (3P) agent 130.

Although local agent 110 is illustrated in FIG. 1 as separate from the device 106, in some implementations all or aspects of the local agent 110 may be implemented by the device 106. For example, in some implementations voice to text engine 112 may be implemented by the device 106. In implementations where one or more (e.g., all) aspects of local agent 110 are implemented by one or more computing devices remote from the device 106, the device 106 and those aspects of the local agent 110 communicate via one or more networks, such as a wide area network (WAN) (e.g., the Internet).

Although only one device 106 is illustrated in combination with the local agent 110, in many implementations the local agent 110 may be remote and may interface with each of a plurality of voice-enabled electronic devices of multiple users. For example, the local agent 110 may manage communications with each of the multiple devices via different sessions and may manage multiple sessions in parallel. For instance, the local agent 110 in some implementations may be implemented as a cloud-based service employing a cloud infrastructure, e.g., using a server farm or cluster of high performance computers running software suitable for handling high volumes of requests from multiple users. However, for the sake of simplicity, many examples herein are described with respect to a single device 106.

The local agent 110 is separate from the 3P agent 130 and communicates with the 3P agent 130 via one or more networks, such as a WAN. In many implementations, the 3P agent 130 is managed by a party that is separate from a party that manages the local agent 110. Although only a single 3P agent 110 is illustrated in FIG. 1, in many implementations the local agent 110 may selectively communicate with each of a plurality of 3P agents. For example, the local agent 110 may facilitate dialog between the device 106 and the 3P agent 130 during a first time period, may facilitate a dialog between the device 106 and an additional 3P agent during a second time period, etc. However, for the sake of simplicity, many examples herein are described with respect to a single 3P agent 130.

Local agent 110 may include a voice to text engine 112, a local parser engine 114, a local action engine 116, and an output engine 118. In some implementations, one or more of the engines of local agent 110 may be omitted, combined, and/or implemented in a component that is separate from local agent 110.

As illustrated in FIG. 1, the local agent 110 receives instances of voice input from the device 106. For example, the local agent may receive voice input in the form of a streaming audio recording. The streaming audio recording may be generated by the device 106 in response to signals received from a microphone of the device 106 that captures spoken input of a user of the device 106. In some implementations, the voice input may be generated by the device 106 and/or provided to the local agent 110 in response to an explicit invocation of the local agent 110 by a user of the device 106. For example, the invocation may be detection by the electronic device of certain voice input of the user (e.g., a local agent 110 key word such as "Hey Assistant"), user interaction with a hardware button and/or virtual button (e.g., a tap of a hardware button, a selection of a graphical interface element displayed by the device 106), and/or other particular user interface input.

As also illustrated in FIG. 1, the local agent 110 provides an instance of output in response to receiving an instance of voice input from the device 106. The instance of output may be, for example, audio to be audibly presented by the device 106 (e.g., output via a speaker of the device 106), text and/or graphical content to be graphical presented by the device 106 (e.g., rendered via a display of the device 106), etc. As described herein, some instances of the output may be based on local responsive content generated by the local agent 110, while other instances of the output may be based on 3P responsive content generated by the 3P agent 130.

The voice to text engine 112 receives an instance of voice input (e.g., in the form of digital audio data), and converts the voice input into text that includes one or more text words or phrases (also referred to herein as tokens). In some implementations, the voice to text engine 112 is a streaming voice to text engine. A streaming voice to text engine converts voice input to text on a token-by-token basis and in real time or near-real time, such that tokens may be output effectively concurrently with a user's speech, and thus prior to a user enunciating a complete spoken request. The voice to text engine 112 may rely on one or more stored voice to text models 152 (also referred to as language models). Each of the voice to text models 152 may model a relationship between an audio signal and phonetic units in a language, along with word sequences in the language. In some implementations, a single voice to text model 152 may be provided, while in other implementations, multiple voice to text models 152 may be provided (e.g., to support multiple languages).

In some implementations, one or more of the voice to text models 152 may implement, for example, a finite state decoding graph defining a plurality of paths mapping digital audio data to text words or phrases. In some implementation, voice to text models 152 may include a base model that may be selectively coupled with, and/or whose output may be selectively modified by, a context-sensitive model (e.g., generated based at least in part on 3P contextual parameters). The base model may support a primary vocabulary that includes relatively common words and phrases likely to be spoken by a user. A context-sensitive model, on the other hand, may include paths for one or more words or phrases, that can be used to effectively augment the vocabulary of the base model for a particular context. The manner in which base models may be integrated with, or otherwise supplemented by, a context-sensitive model may vary in different implementations, e.g., based upon the manner in which paths are encoded into a model.

Some instances of voice input are converted to text by the voice to text engine 112 based on the voice to text model(s) 152 and without performing any biasing that is based on user parameters 158 and/or content provided by the 3P agent 130 (e.g., 3P contextual parameters provided by the 3P agent 130). However, for some other instances of voice input, the voice to text engine 112 uses content provided by the 3P agent 130, and/or user parameters 158, in the conversion of voice input to text. For example, the voice to text engine 112 may bias the voice to text conversion of voice input based on 3P contextual parameters that are provided by the 3P agent 130 prior to receipt of that voice input. For instance, the voice to text engine 112 may generate, over the voice to text models 152 and based on that voice input, scores for all or portions of candidate token(s) and/or sequences of token(s), and modify those scores based on received 3P contextual parameters. Additional and/or alternative techniques may be utilized by the voice to text engine 112 to convert voice input to text based on content provided by the 3P agent. Additional description of implementations of the voice to text engine 112 are described with reference to methods 200, 300, and 400 of FIGS. 2-4.

Whereas voice to text engine 112 converts speech to text, local parser engine 114 attempts to discern the semantics or meaning of the text output by engine 112 for the purpose of determining an appropriate response to the text. For example, the local parser engine 114 may attempt to discern the semantics of text to determine if the text invokes a 3P agent, if the text is to be handled locally by the local agent 110 or remotely by a 3P agent, and/or to determine other actions and/or attributes associated with the text. The local parser engine 114 may rely on one or more stored grammar model(s) 154 to map text to particular actions and to identify attributes that constrain the performance of such actions, e.g., input variables to such actions. In some implementations, a single grammar model 154 may be provided, while in other implementations, multiple grammar models 154 may be provided (e.g., to support different actions or action domains).

As an example, a grammar model 154 may support actions for invoking various 3P agents. For example, local parser engine 114 may receive a sequence of tokens and map the sequence of tokens to the actions of establishing a communications session with 3P agent 130 and facilitating a dialog between the 3P agent 110 and the device 106. As another example, grammar model 154 may optionally support local actions such as a "setting a reminder" action, having a reminder type parameter that specifies what type of reminder to set, an item parameter that specifies one or more items associated with the reminder, and a time parameter that specifies a time to activate the reminder and remind the user. For instance, local parser engine 114 may receive a sequence of tokens such as "remind me to," "pick up," "bread," and "after work" and map the sequence of tokens to the action of setting a reminder with the reminder type parameter set to "shopping reminder," the item parameter set to "bread" and the time parameter of "5:00 pm,", such that at 5:00 pm that day the user receives a reminder to "buy bread."

The local action engine 116 may work in conjunction with the local parser engine 114 and perform one or more actions as dictated by parsed text (e.g., action(s) and action parameter(s)) provided by local parser engine 114. For example, if the local parser engine 114 determines that text invokes the 3P agent 130 and includes action parameters to pass to the 3P agent 130, the local action engine 116 may establish a communications session with the 3P agent and transmit the action parameters to the 3P agent 130. For local actions, the local action engine 116 may generate local responsive content and provide that local responsive content to the output engine 118 for providing corresponding output for presentation to a user via the device 106. The local action engine 116 may utilize one or more stored content models 156 for generating local content and/or performing other actions. The content models 156 may, for example, incorporate various rules for creating local responsive content.

The output engine 118 provides instances of output to the device 106. An instance of output may be based on local responsive content (from local action engine 116) and/or 3P responsive content (e.g., from 3P agent 130 or other 3P agent). In some implementations, the output engine 118 may include a text to speech engine that converts textual components of responsive content to an audio format, and the output provided by the output engine 118 is in an audio format (e.g., as streaming audio). In some implementations, the responsive content may already be in an audio format. In some implementations, the output engine 118 additionally or alternatively provides textual reply content as output (optionally for conversion by the device 106 to audio) and/or provides output for graphical display by the device 106.

When the local agent 110 is facilitating a dialog between the device 106 and the 3P agent 110, the voice to text engine 112 converts instances of voice input received during the dialog to text, and the local agent 110 provides at least some of that text to the 3P agent 130. Further, the 3P agent 130 provides instances of 3P responsive content to the local agent 110 and the output engine 118 generates instances of output based on corresponding instance of 3P responsive content. In some situations, output from the local parser engine 114 and/or the local action engine 116 may also be provided to the 3P agent 110 (e.g., to facilitate semantic understanding of text by the 3P agent 110). However, in other situations just converted text from the voice to text engine 112 may be provided (e.g., the 3P agent 130 performs its own semantic processing).

The 3P agent 130 may include a 3P contextual parameters engine 132 and a 3P content engine 134. In some implementations, the engines 132 and 134 may be combined. In many implementations, the 3P agent 130 may include additional engines such as its own local parser engine. Moreover, in many implementations the 3P agent 130 may access various stored models and/or other resources (e.g., its own grammar model(s) and/or content model(s)) in generating 3P contextual parameters and/or 3P responsive content.

In response to text (and optionally additional content) provided by local agent 110, the 3P content engine 134 generates 3P responsive content that is responsive to the text. The 3P content engine 134 may utilize 3P grammar model(s) and/or content model(s) in generating the 3P responsive content.

For some 3P responsive content, the 3P contextual parameters engine 132 provides 3P contextual parameters that indicate one or more potential features of further voice input to be provided in response to that 3P responsive content. The 3P contextual parameters engine 132 may utilize one or more models of the 3P agent in determining contextual parameters that are appropriate for given 3P responsive content. For example, a grammar model of the 3P agent may map instances of 3P responsive content to corresponding 3P contextual parameters.

As some examples, assume 3P agent 130 provides "restaurant reservation" functionality. For 3P responsive content of "what time", contextual parameters may be mapped thereto that indicate a semantic type of "time". They may be transmitted by the 3P agent 130 to the local agent 110 for use by the voice to text engine 112 to bias voice to text conversion of at least some responsive voice input (received responsive to output based on "what time") toward tokens having a semantic type of "time" (e.g., to bias toward "8:00" vs. "ate" for voice input of "eight"). For 3P responsive content of "any seating preferences", contextual parameters may be mapped thereto that indicate explicit tokens such as "outdoor", "patio seating", "indoor", "booth", "table", etc. They may be transmitted by the 3P agent 130 to the local agent 110 for use by the voice to text engine 112 to bias voice to speech conversion of at least some responsive voice input (received responsive to output based on "any seating preferences") toward those tokens. For 3P responsive content of "which restaurant", contextual parameters may be mapped thereto that indicate a semantic type of "restaurant". They may be transmitted by the 3P agent 130 to the local agent 110 for use by the voice to text engine 112 to bias voice to speech conversion of at least some responsive voice input (received responsive to output based on "which restaurant") toward names of restaurants. For instance, the voice to text engine 112 may optionally utilize the "restaurant" semantic type and user parameters 158 to identify, and bias towards, restaurant names stored in association with the user (e.g., restaurants "local" to the user). Also, for instance, the voice to text engine 112 may additionally or alternatively optionally utilize the "restaurant" semantic type and previously provided names of restaurants supported by the 3P agent 130 to identify, and bias towards, restaurant names stored in association with the 3P agent 130.

In some implementations, the voice to text engine 112 may additionally or alternatively infer 3P contextual parameters based on the 3P responsive content itself (in addition to, or in lieu of, 3P contextual parameters). For example, based on the presence of "restaurant" in 3P responsive content of "which restaurant?", the voice to text engine 112 may utilize the user parameters 158 to identify, and bias towards, restaurant names stored in association with the user. In some implementations, where the voice to text engine 112 infers 3P contextual parameters based on the 3P responsive content itself, the 3P agent 130 may optionally omit the 3P contextual parameters engine 132 and may not transmit 3P contextual parameters that are in addition to the 3P responsive content.

In FIG. 1, the 3P responsive content is illustrated as being provided to the output engine 118 and the 3P contextual parameters are illustrated as being provided to the voice to text engine 112. However, in some implementations, both the 3P responsive content and the 3P contextual parameters are provided to the local agent 110 directly, which then provides them to one or more of its engines. For example, the local agent 110 may provide both the 3P contextual parameters and the 3P responsive content to the voice to text engine 112. When both 3P responsive content and 3P contextual parameters are transmitted to the local agent 110, they may be transmitted in a single transmission or in separate transmissions.

Turning now to FIGS. 2-5, examples of methods that may be performed by components of the environment of FIG. 1 are described.

Figure 2:
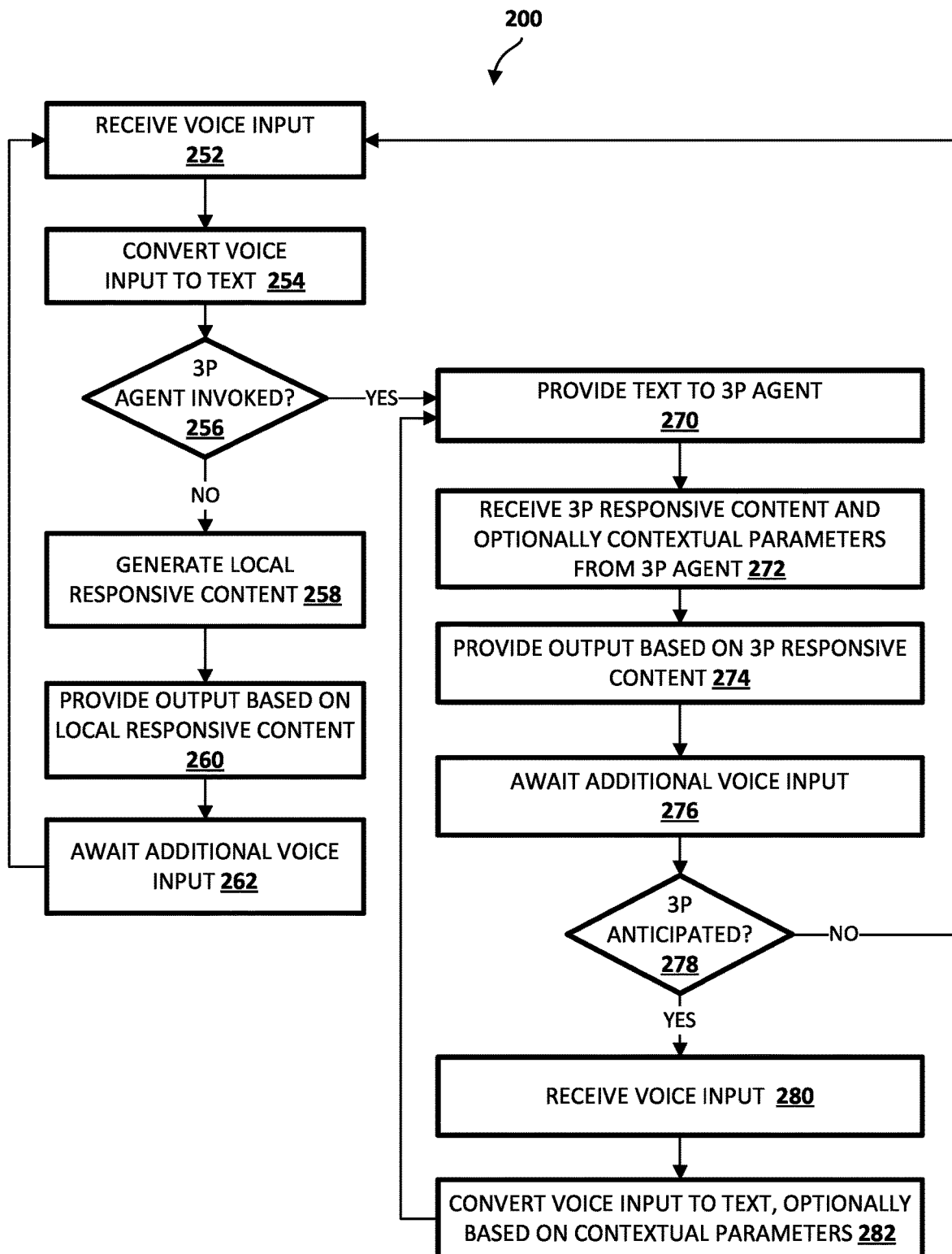
FIG. 2 is a flowchart illustrating an example method of dynamically adapting voice to text conversion based on third-party agent provided content.

FIG. 2 is a flowchart illustrating an example method 200 of dynamically adapting voice to text conversion based on third-party agent provided content. For convenience, the operations of the flow chart are described with reference to a system that performs the operations. This system may include various components of various computer systems, such as one or more components of local agent 110. Moreover, while operations of method 200 are shown in a particular order, this is not meant to be limiting. One or more operations may be reordered, omitted or added.

At block 252, the system receives voice input. For example, the system may receive voice input in the form of streaming audio data generated by a voice enabled-electronic device based on spoken input sensed by a transducer of the device.

At block 254, the system converts the voice input to text. For example, a voice to text engine of the system may convert the voice input to text using a voice to text model, such as a finite state decoding graph.

At block 256, the system determines whether the converted text invokes a 3P agent. For example, the system may determine a particular 3P agent is invoked based on the converted text including key word(s) for the particular 3P agent and/or reference to an action and/or item managed by the particular 3P agent. In some implementations, the system may analyze the text as it is being converted (e.g., token by token) and may determine invocation of the 3P agent based on converted text from a first segment of the voice input. In some of those implementations, the system may optionally utilize one or more pre-stored contextual parameters for the 3P agent in performing voice to text conversion of the remaining segment of the voice input. One example of this is described in more detail in method 400 of FIG. 4.

If the system determines at bock 256 that a 3P agent is not invoked, the system proceeds to blocks 258, 260, and 262. At block 258 the system generates local responsive content. For example, the system may generate the local responsive content utilizing local grammar models and/or local content models of the system. At block 260, the system provides output that is based on the local responsive content. For example, the output may be the local responsive content or a conversion (e.g., a text to speech conversion) of the local responsive content. The output is provided for presentation (e.g., audible or graphical) via the voice-enabled electronic device. At block 262, the system awaits additional voice input and proceeds back to block 252 upon receiving additional voice input.

If the system determines at bock 256 that a 3P agent is invoked, the system proceeds to block 270. At block 270, the system provides at least some of the converted text to the invoked 3P agent. In some implementations, the system may provide additional content in combination with the text, such as semantic labels for the text that are generated by a parser engine and/or other component of the system.

At block 272, the system receives 3P responsive content from the 3P agent in response to providing the text to the 3P agent at block 270. The 3P responsive content is responsive to the text provided at block 270 and may be generated by the 3P agent utilizing its own semantic processing engines and/or its own semantic models. In some implementations, at block 272, the system also receives contextual parameters from the 3P agent. Those contextual parameters may be provided in combination with the 3P responsive content and may indicate one or more potential features of further voice input to be provided in response to the 3P responsive content. In some iterations of block 272, contextual parameters may not be received and/or "default" context may be indicated. For example, if the 3P responsive content received at block 272 is a "tell"/"resolution" instead of an "ask"/"prompt", the 3P agent may not provide contextual parameters since further voice input directed to the 3P agent is not anticipated. Also, for example, if the 3P responsive content is an "ask"/"prompt", in some situations the 3P agent may nonetheless not provide contextual parameters and/or indicated "default" context should be utilized. For instance, if the 3P responsive content asks a relatively unconstrained question (e.g., "what do you want to say in your email?"), then the 3P agent may indicate "default" context should be utilized.

At block 274, the system provides output that is based on the 3P responsive content. For example, the output may be the 3P responsive content or a conversion (e.g., a text to speech conversion) of the 3P responsive content. The output is provided for presentation (e.g., audible or graphical) via the voice-enabled electronic device.

At optional block 278, the system determines whether the additional voice input it is awaiting at block 276 is anticipated to be directed to the 3P agent. In some implementations, the responsive content received at block 272 may indicate whether further voice input that is directed to the 3P agent is anticipated. For example, the responsive content may indicate whether it is an "ask"/"prompt" that requests further 3P agent related voice input (in which case further input that is directed to the 3P agent is anticipated) or, alternatively, is a "tell"/"resolution" that does not anticipate further 3P agent related voice input (in which case further input that is directed to the 3P agent is not anticipated).

If, at block 278, it is determined that further voice input directed to the 3P agent is not anticipated, the system may proceed back to block 252 upon receiving additional voice input (e.g., voice input that again invokes the system).

If at block 278, it is determined that further voice input directed to the 3P agent is anticipated, the system proceeds to block 280 upon receiving additional voice input. In some of those implementations the system may also provide (e.g., with the output at block 274), a command that causes microphone(s) (or other transducer(s) and/or associated components) of the voice-enabled electronic device to be "opened" in anticipation of receiving further voice input. In some implementations, block 278 may be omitted (e.g., the system may proceed from block 276 to block 280).

At block 280, the system receives additional voice input.

At block 282, the system converts the voice input received at block 280 to text. In some iterations of block 282, the system converts the voice input of block 280 to text based on contextual parameters received in a most recent iteration of block 272 and/or inferred from 3P responsive content received in a most recent iteration of block 272. For example, the system may bias the voice to text conversion based on tokens, state paths, and/or other features explicitly included in received 3P contextual parameter and/or otherwise indicated by the received 3P contextual parameters. For instance, the system may generate scores for tokens and/or sequences of tokens using the same voice to text model utilized in block 254, but modify one or more of the generated scores based on the contextual parameters. Also, for instance, the system may traverse one or more decoding graphs of a voice to text model, while weighting one or more state paths indicated in the contextual parameters. Also, for example, the system may effectively add one or more "out of value" tokens to the state model based on tokens included in, or indicated by, the contextual parameters.

As described herein, in some implementations the system may optionally utilize user parameters and/or previously provided 3P contextual parameters, in combination with content received at block 272, in performing voice to text conversion in block 282.

Also, in some iterations of block 282, the system may utilize contextual parameters received at block 272 to bias conversion of a first segment of voice input, but not utilize the received contextual parameters in biasing the second segment of voice input. For example, a contextual parameter may indicate voice input is likely to include a "reply" token (e.g., "reply with", "respond with", "tell him/her"), followed by "open text". In such a scenario, voice to text conversion may initially be biased toward "reply" tokens but, once a reply token is detected in converted text, the system may switch to a "non reply biased" voice-to text conversion since "open text" is indicated as likely to follow the detected reply token. A "non reply biased" voice to text conversion may be, for example, one that is based on a baseline voice to text/language model. As yet a further example, a contextual parameter may be of the form "message $contact $some raw text", which indicates voice input may include the token "message", followed by a "contact" token (e.g., a name of a contact of the user stored in user parameters), followed by "open text". In such a scenario, voice to text conversion may initially be biased toward the token "message". In response to detection of the "message" token, the voice to text conversion may then biased toward tokens that are names of contacts of the user. Then, in response to detection of contact token(s), the voice to text conversion may be unbiased (e.g., based on a baseline voice to text model).

Following block 282, the system proceeds to block 270 and provides at least some of the converted text from block 282 to the 3P agent, then performs one or more iterations of subsequent blocks. As appreciated from the above description and the flow chart of FIG. 2, the voice to text conversion of block 282 may be dynamically updated at each iteration to bias towards features of voice input that are more likely to be received based on the content received from the 3P agent in the most recent iteration of block 272.

Figure 3:
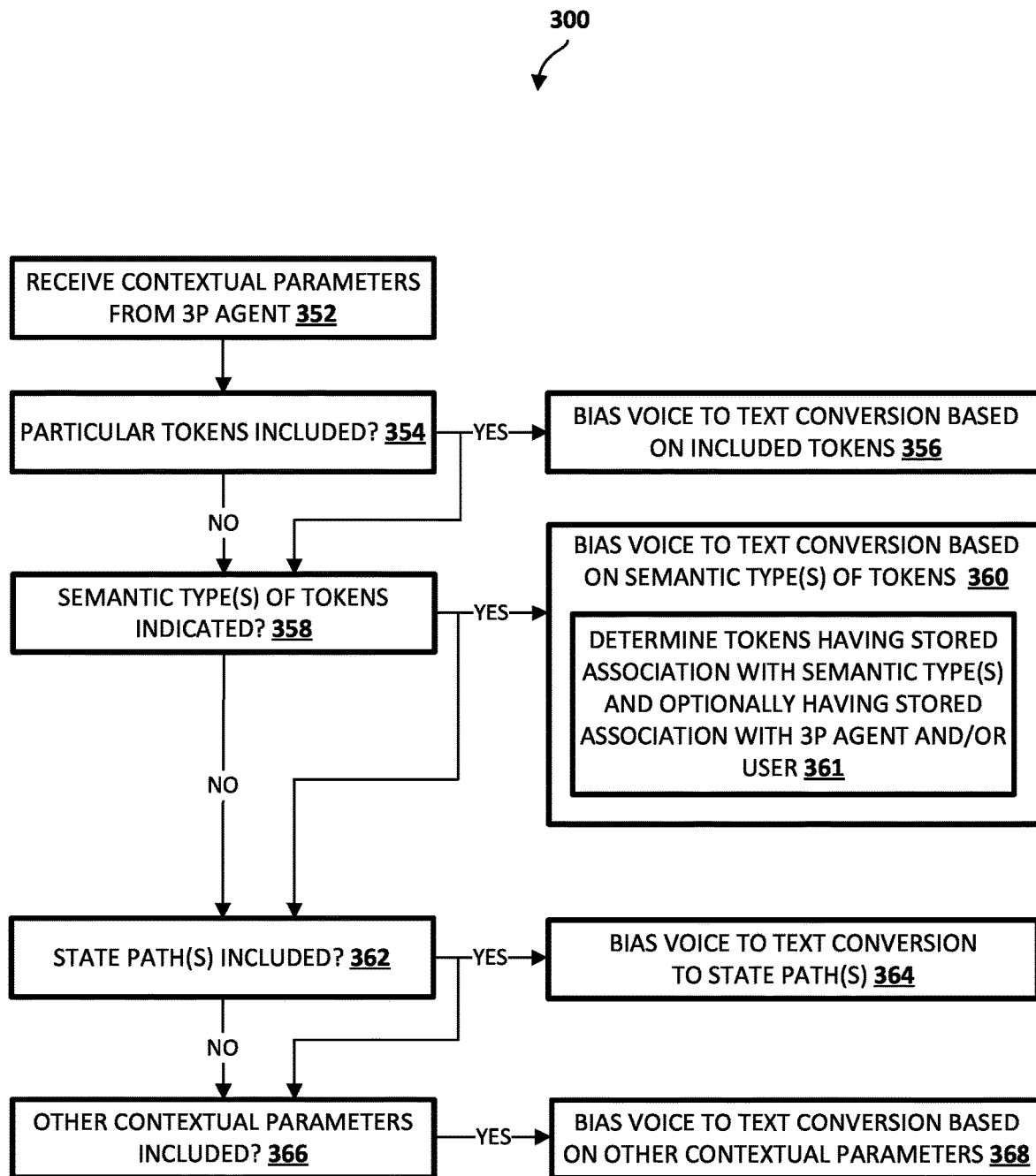
FIG. 3 is a flowchart illustrating an example method of using contextual parameters received from a third-party agent to bias voice to text conversion.

FIG. 3 is a flowchart illustrating an example method 300 of using contextual parameters received from a third-party agent to bias voice to text conversion. For convenience, the operations of the flow chart are described with reference to a system that performs the operations. This system may include various components of various computer systems, such as one or more components of local agent 110 (e.g., voice to text engine 112). Moreover, while operations of method 300 are shown in a particular order, this is not meant to be limiting. One or more operations may be reordered, omitted or added.

Method 300 provides some non-limiting examples of how contextual parameters received from a 3P agent (e.g., at an iteration of block 272 of method 200 of FIG. 2) may be utilized to bias voice to text conversion (e.g., at an iteration of block 282 of method 200 of FIG. 2).

At block 352, the system receives contextual parameters from a 3P agent. For example, the system may receive the contextual parameters at block 272 of the method 200 of FIG. 2.

At block 354, the system determines whether particular tokens are included in the contextual parameters. If so, the system proceeds to block 356 and biases voice to text conversion based on the included tokens. For example, the system may effectively add some of the included tokens to a base voice to text model (e.g., if they are out of vocabulary tokens) and/or may positively bias scores of some of the included tokens during voice to text conversion.

The system also performs block 358. At block 358, the system determines whether semantic type(s) of tokens are indicated in the contextual parameters. If so, the system proceeds to block 360 and biases voice to text conversion based on the semantic type(s) of tokens. In some implementations, the system biases the voice to text conversion based on modifying scores or other values of tokens associated with the sematic type(s) during voice to text conversion. In some implementations, the system may perform block 361 as part of block 360. At block 361, the system determines tokens having a stored association with the semantic type(s) and optionally having a stored association with: the 3P agent (e.g., previously provided by the 3P agent in association with the semantic type(s)) and/or the user (e.g., previously stored in association with the user and optionally the semantic type(s) in user parameters). In some of those implementations, the determined tokens may be utilized to bias the voice to text conversion in a manner such as that described with respect to block 356.

The system also performs block 362. At block 362, the system determines whether state path(s) are indicated in the contextual parameters. If so, the system proceeds to block 364 and biases voice to text conversion based on the state path(s). For example, the voice to text conversion may utilize a finite state decoding graph and/or other model having multiple state paths, and may bias, during voice to text conversion using such a model, toward one or more of those state paths that are indicated in the 3P contextual parameters.

The system also performs block 366. At block 362, the system determines whether other contextual parameter(s) are included in the contextual parameters. If so, the system proceeds to block 368 and biases voice to text conversion based on those contextual parameter(s).

In many implementations and/or iterations of method 300, multiple of blocks 356, 360, 364, and 368 may be performed during all or portions of a voice to text conversion. For example, contextual parameters received from a 3P agent may include particular tokens and semantic types of tokens, and both blocks 356 and 360 may be performed. In some implementations, one or more blocks of method 300 may be omitted. For example, in some implementations, state path(s) may not be supported and blocks 362 and 364 may be omitted.

Figure 4:
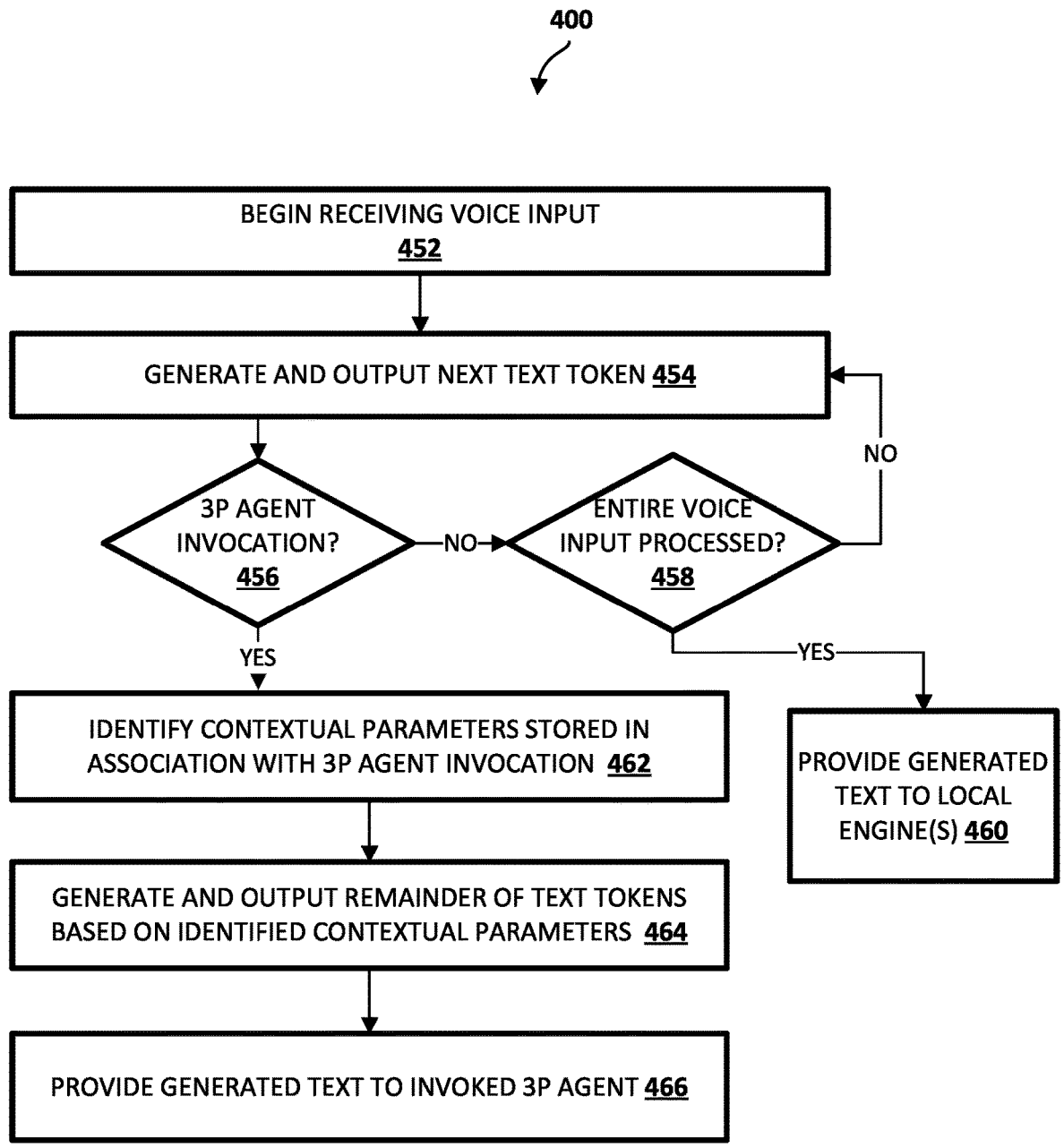
FIG. 4 is a flowchart illustrating an example method of detecting an invocation of a third-party agent based on voice to text conversion of a first portion of voice input, and based on detecting the invocation: using contextual parameters stored in association with the invocation to perform voice to text conversion of a second portion of the voice input.

FIG. 4 is a flowchart illustrating an example method 400 of detecting an invocation of a third-party agent based on voice to text conversion of a first portion of voice input, and based on detecting the invocation: using contextual parameters stored in association with the invocation to perform voice to text conversion of a second portion of the voice input. This system may include various components of various computer systems, such as one or more components of local agent 110 (e.g., voice to text engine 112). Moreover, while operations of method 400 are shown in a particular order, this is not meant to be limiting. One or more operations may be reordered, omitted or added.

Method 400 provides some non-limiting examples of how a 3P agent invocation in text converted from a first segment/portion of voice input may be utilized to bias voice to text conversion of a second segment/portion of the voice input. For example method 400 may be performed during blocks 252, 254, and 256 of method 200 of FIG. 2.

At block 452, the system begins receiving voice input.

At block 454, the system generates and outputs a next text token based on the so-far received voice input.

At block 456, the system determines whether a 3P agent invocation is present in the text token(s) generated at one or more iterations of block 454. For example, the system may determine a particular 3P agent is invoked based on the text token(s) including key word(s) for the particular 3P agent and/or reference to an action and/or item managed by the particular 3P agent.

If the system determines a 3P agent invocation is not present, the system proceeds to block 458 and determines whether the entire voice input is processed (e.g., no more voice input remains and at least a threshold time duration has passed since receiving voice input). If so, the system proceeds to block 460 and provides the generated text to local engine(s) of the system, such as a local parser engine and/or local action engine. If not, the system proceeds back to block 454 and generates and outputs the next text token.

If, at an iteration of block 456, the system determines a 3P agent has been invoked, the system proceeds to block 462.

At block 462, the system identifies contextual parameters stored in association with the 3P agent invocation. For example, for a "restaurant reservation" 3P agent may identify semantic types of "time", "date", "restaurant name", etc. Additional or alternative types of contextual parameters may be determined, such as explicit tokens, state path(s), etc.

At block 464, the system generates an outputs the remainder of the text tokens based on the identified contextual parameters. For example, the system biases the voice to text conversion of the remaining (or yet to be received) segment of the voice input based on the contextual parameters identified at block 462.

At block 466, the system provides at least some of the generated text to the invoked 3P agent.

Figure 5:
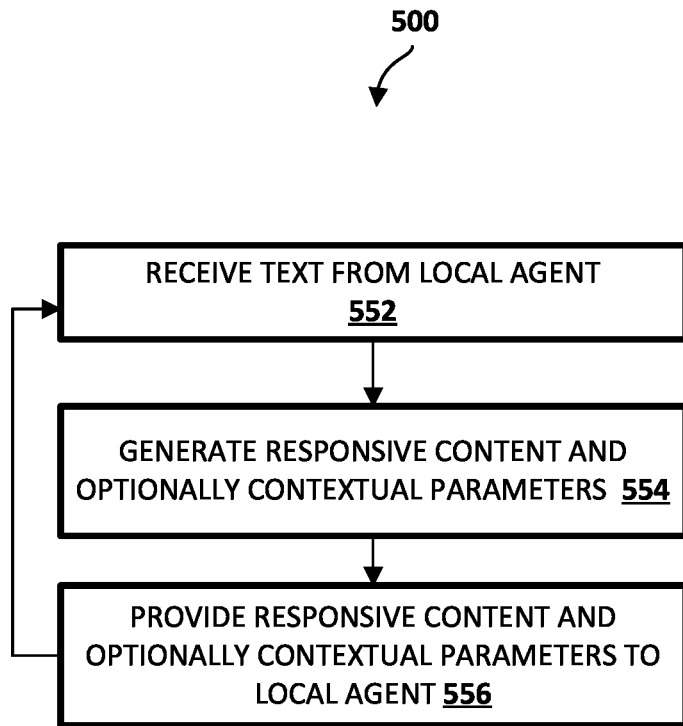
FIG. 5 is a flowchart illustrating an example method of receiving text from a local agent and providing responsive content and optionally contextual parameters to the local agent in response to receiving the text.

FIG. 5 is a flowchart illustrating an example method 500 of receiving text from a local agent and providing responsive content an optionally parameters to the local agent in response to receiving the text. This system may include various components of various computer systems, such as one or more components of 3P agent 130. Moreover, while operations of method 500 are shown in a particular order, this is not meant to be limiting. One or more operations may be reordered, omitted or added.

At block 552, the system receives text from a local agent. For example, the system may receive text transmitted to the 3P agent at block 270 of method 200 of FIG. 2.

At block 554, the system generates responsive content based on the text received form the local agent at block 552. In some iterations of block 554, the system may also generate contextual parameters that indicate one or more potential features of further voice input to be provided in response to the responsive content generated at block 554. Various types of contextual parameters may be generated, such as those described herein.

In some implementations, at block 554, the system determines whether to generate contextual parameters based on one or more factors. For example, if the generated responsive content does not prompt the user for additional input (i.e., is a "tell"/"resolution"), the system may not generate contextual parameters for providing with the generated responsive content. Also, for example, if the generated responsive content solicits an "open reply", the system may not generate contextual parameters for providing with the generated responsive content. Alternatively, instead of not generating contextual parameters for providing with the generated responsive content, the system may instead generate "default" contextual parameters that indicate 3P agent based biasing should not be used. In some implementations, the system may generate one or more contextual parameters that indicate 3P agent based biasing should be initially performed in voice to text conversion of voice input and, once converted text is generated that has one or more properties (e.g., that is an indicated token), 3P agent based biasing should no longer be utilized in voice to text conversion of that voice input (e.g., "open text" biasing should instead be used).

At block 556, the system provides the responsive content of block 554, and optionally the contextual parameters of block 554 (if any), to the local agent. For example, such content may be transmitted to the local agent and received by the local agent in an iteration of block 272 of method 200 of FIG. 2.

Figure 6:
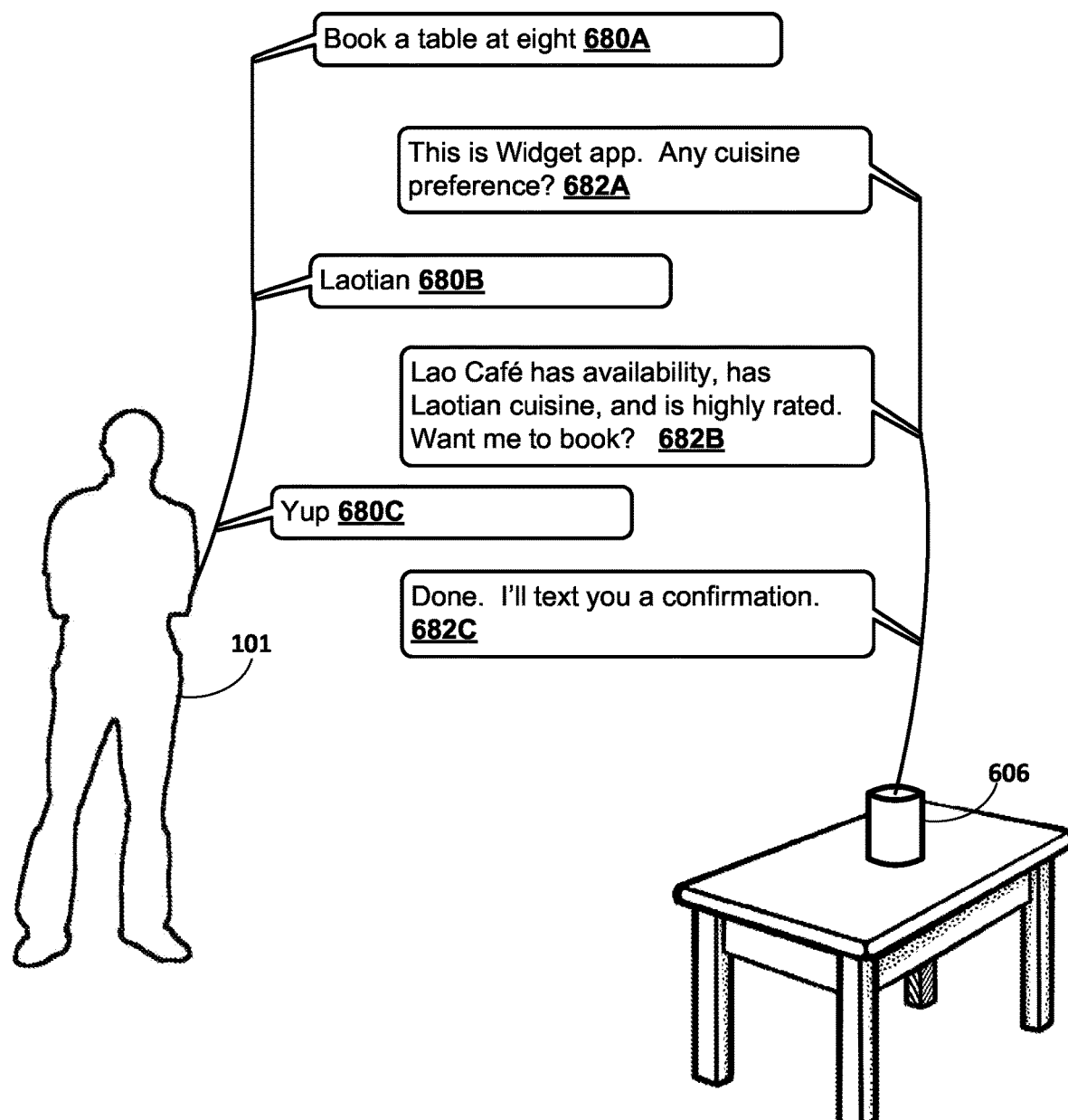
FIG. 6 illustrates a user, a voice-enabled electronic device, and a dialog between the user and a third-party agent that may be facilitated by a local agent associated with the voice-enabled electronic device, according to implementations disclosed herein.

FIG. 6 illustrates a user 101, a voice-enabled electronic device 606, and a dialog between the user 101 and a third-party agent that may be facilitated by a local agent associated with the voice-enabled electronic device 606, according to implementations disclosed herein. The voice-enabled electronic device 606 includes one or more microphones and one or more speakers. One or more aspects of the local agent 110 of FIG. 1 may be implemented on the computing device 606 and/or on one or more computing devices that are in network communication with the computing device 606. Accordingly, for ease in explanation the local agent 110 is referenced in description of FIG. 6.

In FIG. 6, the user provides spoken input 680A of "Book a table at eight". Voice input corresponding to the spoken input is generated by the device 606 and provided to the local agent 110 (e.g., as streaming voice input). In some implementations, the local agent 110 may utilize the method 400 of FIG. 4 to determine an invocation of a particular 3P agent based on voice to text conversion of a first portion ("Book a table") of the voice input corresponding to the spoken input. Moreover, the local agent 110 may, based on determining the invocation of the particular 3P agent, perform voice to text conversion of a second portion ("at eight") of the voice input corresponding to the spoken input, based on stored contextual parameters that are stored in association with invocation of the particular 3P agent. For example, the contextual parameters may indicate semantic type(s) of "time" and may be utilized to bias the voice to text conversion to be more likely to convert "eight" to "8:00" (or "20:00") than to "ate".

Responsive output 682A is provided, by the device 606, to the user in an audible form. The output 682A may be based on audio data generated by the local agent 110 based on 3P responsive content of the invoked 3P agent. For example, in response to the invocation of the 3P agent, the local agent 110 may transmit at least some of the converted text corresponding to spoken input 680A to the 3P agent, receive text of "Any cuisine preference?" in return, and convert that text (and the "introductory" text "This is Widget" app) to the audio data.

In response to the responsive output 682A, the user provides further spoken input 680B of "Laotian". Voice input corresponding to the spoken input is generated by the device 606 and provided to the local agent 110. In some implementations, the local agent 110 may utilize the responsive content from the 3P agent used to generate the responsive output 682A, and/or 3P contextual parameters received in combination with the responsive content, to perform voice to text conversion of the voice input. For example, provided 3P contextual parameters may have included the out of vocabulary token "Laotian", and the voice to text conversion may be performed after adding that out of vocabulary token to the voice to text model. Accordingly, the voice input textual conversion may be recognized as "Laotian", whereas it may have otherwise been recognized as an alternative term (e.g., "vacation") that would not reflect the user's spoken input.

Further responsive output 682B is provided, by the device 606, to the user in an audible form. The output 682B may be based on audio data generated by the local agent 110 based on 3P responsive content of the invoked 3P agent. For example, in response to conversion of the voice input corresponding to spoken input 680B, the local agent 110 may transmit at least some of the converted text to the 3P agent, receive text of "Lao Café has availability at eight, has Laotian cuisine, and is highly rated. Want me to book?" in return, and convert that text to the audio data.

In response to the further responsive output 680C, the user provides further spoken input 680C of "yup". Voice input corresponding to the spoken input is generated by the device 606 and provided to the local agent 110. In some implementations, the local agent 110 may utilize the responsive content from the 3P agent used to generate the responsive output 682B, and/or 3P contextual parameters received in combination with the responsive content, to perform voice to text conversion of the voice input. For example, provided 3P contextual parameters may have indicated tokens of the semantic type "affirmative or negative reply" are anticipated. Accordingly, the voice input conversion to text may be biased toward the affirmative answer "yup", which may prevent otherwise inaccurate conversion (e.g., to "pup").

Further responsive output 682C is provided, by the device 606, to the user in an audible form. The output 682C may be based on audio data generated by the local agent 110 based on 3P responsive content of the invoked 3P agent. For example, in response to conversion of the voice input corresponding to spoken input 680C, the local agent 110 may transmit at least some of the converted text to the 3P agent, receive text of "Done. I'll text you a confirmation" in return, and convert that text to the audio data. As the reply content is "resolution" reply output, the 3P agent may not provide any 3P contextual parameters to the local agent 110 with the reply content and/or the local agent may not perform biasing directed toward that 3P agent in conjunction with the next received voice input from the device 606.

Figure 7:
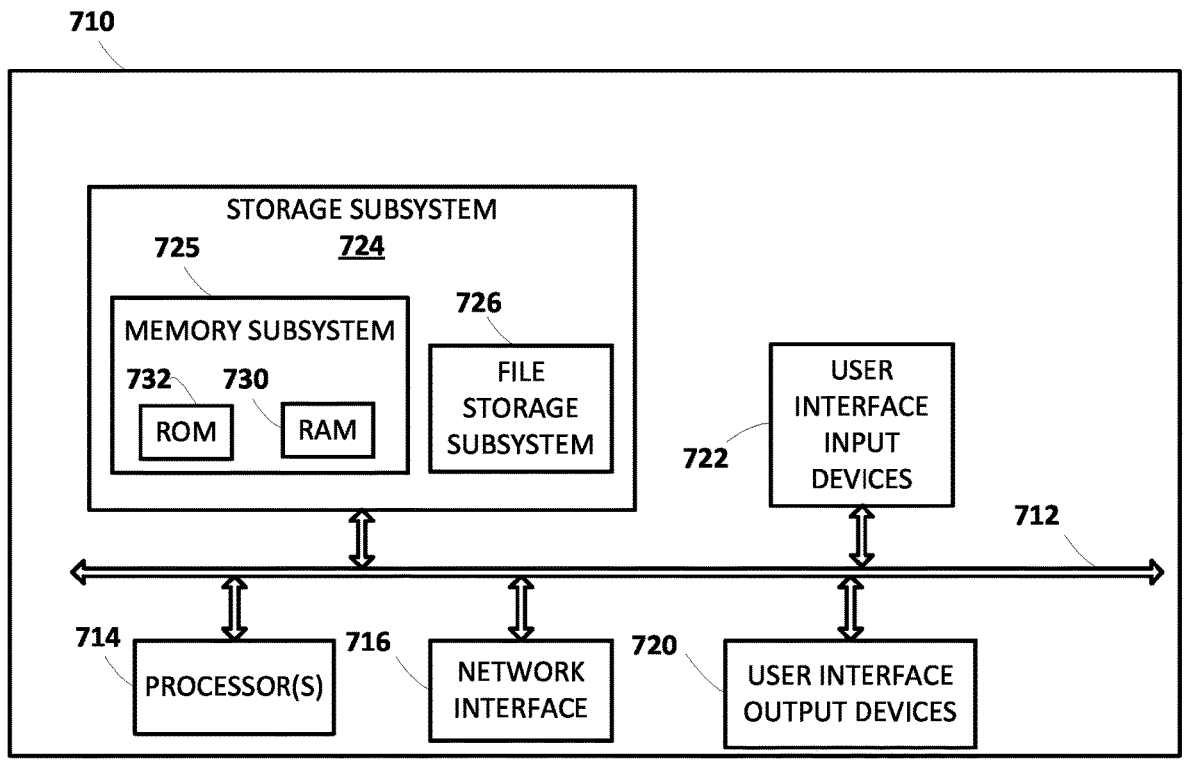
FIG. 7 illustrates an example architecture of a computing device.

FIG. 7 is a block diagram of an example computing device 710 that may optionally be utilized to perform one or more aspects of techniques described herein. In some implementations, one or more of device 106, local agent 110, 3P agent 130, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method(s) of FIGS. 2, 3, 4, and/or 5.

These software modules are generally executed by processor 714 alone or in combination with other processors. Memory 725 used in the storage subsystem 724 can include a number of memories including a main random access memory (RAM) 530 for storage of instructions and data during program execution and a read only memory (ROM) 532 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 5 is intended only as a specific example for purposes of illustrating some implementations. Many other configurations of computing device 710 are possible having more or fewer components than the computing device depicted in FIG. 5.

In situations in which certain implementations discussed herein may collect or use personal information about users (e.g., user data extracted from other electronic communications, information about a user's social network, a user's location, a user's time, a user's biometric information, and a user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented by one or more processors, the method comprising:
　receiving, by a third-party agent, and from a local agent that is local to a voice-enabled electronic device of a user, an invocation request for content;
　in response to receiving the invocation request for the content, generating, by the third-party agent, responsive content that is responsive to voice input, provided by the user of the voice-enabled electronic device, that is directed to the local agent, and that is to be provided by the local agent in response to the voice input via the voice-enabled electronic device;
　identifying, by the third-party agent, one or more contextual parameters that are in addition to the responsive content and that are indicative of further voice input, anticipated to be provided by the user of the voice-enabled electronic device, in response to the responsive content being output for presentation to the user via the voice-enabled electronic device; and
　transmitting, by the third-party agent, and to the local agent, the responsive content and the one or more contextual parameters, wherein transmitting the responsive content and the one or more contextual parameters to the local agent cause to the local agent to:
　　output, for presentation to the user via the voice-enabled electronic device, the responsive content in response to the voice input;
　　receive, via the voice-enabled electronic device, an additional voice input provided by the user and in response to the output being provided for presentation to the user;
　　determine, via the voice-enabled electronic device, text to transmit to the third-party agent, wherein text is based on a voice to text conversion of the additional voice input and is based on one or more of the contextual parameters; and
　　transmit the text to the third-party agent.

2. The method of claim 1, wherein one or more of the contextual parameters comprise one or more semantic types of tokens.

3. The method of claim 2, wherein one or more of the semantic types of tokens identify one or more of a time semantic type and a date semantic type.

4. The method of claim 1, wherein the responsive content and one or more of the contextual parameters are transmitted to the local agent as part of a single transmission by the third-party agent.

5. The method of claim 1, further comprising:
　receiving, by the third-party agent, and from the local agent, the text; and
　transmitting, by the third-party agent, and to the local agent, additional responsive content in response to receiving the text, the additional responsive content including:
　　additional responsive content that is determined based on the text, and that is to be provided in response to the additional voice input.

6. The method of claim 5, further comprising:
　transmitting, by the third-party agent, and to the local agent, the additional responsive content, wherein transmitting the additional responsive content to the local agent cause to the local agent to:
　　output, for presentation to the user via the voice-enabled electronic device, the additional responsive content in response to the additional voice input.

7. The method of claim 5, wherein the additional responsive content further includes one or more additional contextual parameters associated with the third-party agent, wherein one or more of the additional contextual parameters differ from one or more of the contextual parameters, and wherein one or more of the additional contextual parameters are indicative of yet further voice input, anticipated to be provided by the user of the voice-enabled electronic device, in response to the additional responsive content being output for presentation to the user via the voice-enabled electronic device.

8. The method of claim 1, wherein, in determining the text based on the voice to text conversion of the additional voice input and based on one or more of the contextual parameters, the local agent utilizes, in the voice to text conversion, a language model generated using one or more of the contextual parameters.

9. The method of claim 1, wherein, in determining the text based on the voice to text conversion of the additional voice input and based on one or more of the contextual parameters, the local agent adapts a finite state decoding graph based on one or more of the contextual parameters, and wherein the local agent utilizes the finite state decoding graph in the voice to text conversion.

10. The method of claim 1, further comprising:
receiving, by the third-party agent, and from the local agent, parsed text corresponding to the voice input as the invocation request that is based on an initial voice to text conversion of the voice input and by the local agent.

11. A method implemented by one or more processors, the method comprising:
transmitting, to a local agent that is local to a voice-enabled electronic device of a user, one or more contextual parameters associated with a third-party agent, wherein the third-party agent is managed by an additional party that is distinct from the party that manages the local agent, wherein transmitting the one or more contextual parameters to the local agent causes the local agent to:
determine, via the voice-enabled electronic device, text to transmit to the third-party agent, wherein text is based on a voice to text conversion of voice input that is provided by the user and is based on one or more of the contextual parameters, and wherein the voice input is directed to the local agent; and
transmit the text to the third-party agent;
receiving, by the third-party agent, and from the local agent, the text; and
transmitting, by the third-party agent, and to the local agent, responsive content that is responsive to the text, and that is to be provided for presentation to the user in response to the voice input.

12. The method of claim 11, wherein one or more of the contextual parameters comprise one or more particular tokens.

13. The method of claim 11, wherein one or more of the contextual parameters comprise one or more semantic types of tokens.

14. The method of claim 13, wherein one or more of the semantic types of tokens identify one or more of a time semantic type and a date semantic type.

15. The method of claim 11, wherein one or more of the contextual parameters comprise one or more semantic types of tokens and comprise one or more particular tokens.

16. The method of claim 11, wherein the one or more contextual parameters associated with the third-party agent are transmitted to the local agent in response receiving an invocation request from the local agent.

17. A system comprising:
at least one hardware processor; and
memory storing instructions that, when executed by the at least one hardware processor, cause the at least one hardware processor to:
receive, by a third-party agent, and from a local agent that is local to a voice-enabled electronic device of a user, an invocation request for content;
in response to receiving the invocation request for the content, generate, by the third-party agent, responsive content that is responsive to voice input, provided by the user of the voice-enabled electronic device, that is directed to the local agent, and that is to be provided by the local agent in response to the voice input via the voice-enabled electronic device;
identify, by the third-party agent, one or more contextual parameters that are in addition to the responsive content and that are indicative of further voice input, anticipated to be provided by the user of the voice-enabled electronic device, in response to the responsive content being output for presentation to the user via the voice-enabled electronic device;
transmit, by the third-party agent, and to the local agent, the responsive content and the one or more contextual parameters, wherein transmitting the responsive content and the one or more contextual parameters to the local agent cause to the local agent to:
output, for presentation to the user via the voice-enabled electronic device, the responsive content in response to the voice input;
receive, via the voice-enabled electronic device, an additional voice input provided by the user and in response to the output being provided for presentation to the user;
determine, via the voice-enabled electronic device, text to transmit to the third-party agent, wherein text is based on a voice to text conversion of the additional voice input and is based on one or more of the contextual parameters; and
transmit the text to the third-party agent.

* * * * *